United States Patent
Zhang

(10) Patent No.: US 10,318,852 B2
(45) Date of Patent: *Jun. 11, 2019

(54) SMART CARD SIMULTANEOUSLY HAVING TWO READ/WRITE MODES AND METHOD FOR PRODUCING SAME

(71) Applicant: GOLDEN SPRING INTERNET OF THINGS INC., Beijing (CN)

(72) Inventor: Xiaodong Zhang, Beijing (CN)

(73) Assignee: GOLDEN SPRING INTERNET OF THINGS INC., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/097,228

(22) Filed: Apr. 12, 2016

(65) Prior Publication Data
US 2016/0224882 A1  Aug. 4, 2016

Related U.S. Application Data

(63) Continuation of application No. 14/355,398, filed on Nov. 10, 2014, now Pat. No. 9,342,779.

(51) Int. Cl.
*G06K 19/077* (2006.01)
*G06K 19/07* (2006.01)

(52) U.S. Cl.
CPC ..... *G06K 19/0723* (2013.01); *G06K 19/0775* (2013.01); *G06K 19/07745* (2013.01); *G06K 19/07749* (2013.01); *G06K 19/07754* (2013.01); *G06K 19/07718* (2013.01); *G06K 19/07769* (2013.01)

(58) Field of Classification Search
CPC ....... G06K 19/07749; G06K 19/07745; G06K 19/0775; G06K 19/041; G06K 19/0723; G06K 19/07718; G06K 19/07769; G06K 19/07754
See application file for complete search history.

(56) References Cited

U.S. PATENT DOCUMENTS

| | | | | |
|---|---|---|---|---|
| 6,012,641 A | * | 1/2000 | Watada | G06K 19/041 235/457 |
| 6,036,099 A | * | 3/2000 | Leighton | B32B 37/185 156/154 |
| 6,161,761 A | * | 12/2000 | Ghaem | G06K 19/0775 235/380 |
| 2006/0038022 A1 | * | 2/2006 | Reid | G06K 19/07745 235/492 |

(Continued)

*Primary Examiner* — Claude J Brown
(74) *Attorney, Agent, or Firm* — Muncy, Geissler, Olds & Lowe, P.C.

(57) ABSTRACT

A smart card with two read-write modes includes antenna layer, and an antenna and a chip module circuits on the antenna layer, wherein the antenna and the chip module circuit are electrically connected via an elastic conductive device. The invention also provides a manufacturing method of the aforesaid smart card with two read-write modes, which includes steps of: embedding an antenna on a back side or a front side of an antenna layer; after completing embedding on the antenna layer, add bedding sheets, printed sheets and protection films respectively above and underneath the antenna layer, then laminating to obtain a card base carrier; cutting card from the treated whole-sheet card base carrier to obtain a card base, and milling slots on the obtained card base, then finally encapsulating.

6 Claims, 4 Drawing Sheets

(56) References Cited

U.S. PATENT DOCUMENTS

2008/0308641 A1* 12/2008 Finn .................. G06K 19/0723
235/492
2010/0200661 A1* 8/2010 Shafran ............ G06K 19/07745
235/492
2017/0155189 A1* 6/2017 Gragnic .................. H01Q 7/00

* cited by examiner

SMART CARD SIMULTANEOUSLY HAVING TWO READ/WRITE MODES AND METHOD FOR PRODUCING SAME

CROSS REFERENCE OF RELATED APPLICATION

This is a Continuation Application of the Application U.S. Ser. No. 14/355,398, filed Nov. 10, 2014, which claims priority under 35 U.S.C. 119(a-d) to CN 201110344303.1, filed Nov. 3, 2011.

BACKGROUND OF THE PRESENT INVENTION

Field of Invention

The prevent invention belongs to the field of smart card manufacturing, and particularly relates to a smart card simultaneously having two read-write modes and a production method thereof.

Description of Related Arts

A DI (Dual Interface) card is an abbreviation of a smart card simultaneously having two read-write modes. The DI card is made from a PVC (Polyvinyl Chloride) layer, a chip module and a coil and is a card based on single chip module and integrating contact and noncontact interfaces into a whole. The DI card has two operation interfaces, the chip module can be both accessed by a contact point in a contact manner and in a radio frequency manner at a certain distance (within 10 cm) to execute identical operations, the two interfaces abide by two different standards respectively. A contact interface satisfies ISO/IEC 7816, and a noncontact interface satisfies ISO/IEC 14443. The two interfaces share a microprocessor, an operation system and an EEPROM (Electrically-Erasable Programmable Read Only Memory).

An antenna coil connected with a microprocessor chip module is also arranged in the DI card besides the microprocessor chip module, when the noncontact interface is used, an electromagnetic field generated by a reader-writer provides energy, and energy supply and data transmission are achieved in the radio frequency manner.

At present, the main production process of the DI card is divided into two categories. One category comprises the following steps:

providing an antenna and a base material, and pre-laminating to obtain an Inlay (chip module circuit) layer; precisely corresponding a front surface layer comprising a front surface printing material and a protective film and a back surface layer comprising a back surface printing material and a protective film to the Inlay layer, and laminating and cutting card to obtain a card base of the smart card simultaneously having two read-write modes; performing primary groove milling on the position of a chip module of the card base, manually performing such treatments on the antenna on the card base obtained after the primary groove milling as coil wire picking, coil wire laying, coil wire end shearing and the like, then, performing secondary groove milling on the card base; meanwhile, performing tin soldering and milling on two contact points of the chip module on additional equipment, and finally, gradually placing the treated card base and the chip module on a encapsulating machine for encapsulating.

The other category comprises the following steps:

providing an antenna and a base material, and pre-laminating to obtain an Inlay (chip module circuit) layer; precisely corresponding a front surface layer comprising a front surface printing material and a protective film and a back surface layer comprising a back surface printing material and a protective film to the Inlay layer, and laminating and cutting card to obtain a card base of the smart card; performing primary groove milling on the position of a chip module of the card base, and performing secondary groove milling at a contact point of the chip module on the card base obtained after groove milling; injecting conductive adhesive into the secondary groove milling position, and imbedding a chip module in a corresponding contact point for curing; and finally, gradually placing the treated card base and the chip module on a encapsulating machine for encapsulating.

In a process for realizing the production of the above-mentioned DI card, the inventor has found that at least the following problems exist in the prior art: since multiple steps need to be manually finished, such as tin welding and the like, the daily yield is very low, moreover these operation methods are difficult to control and it is also difficult to ensure the product quality even by skilled workers, thus the rejection rate is high, the antenna coil wire end and the chip module are possibly damaged by treatment on tin and copper wires through the method, thus the stability of a finished product card is reduced. The conductive adhesive is adopted, the adhesive contacts external air in the curing process and the curing time is relatively long, so that the electrical conductivity of the conductive adhesive is greatly affected by time and environment, resulting in instable electrical conductivity.

SUMMARY OF THE PRESENT INVENTION

The technical problem to be solved in the present invention is to provide a smart card simultaneously having two read-write modes and a production method thereof, the smart card being high in yield, good in product quality, high in rate of finished products and high in stability.

In order to solve the above-mentioned technical problem, the present invention adopts the following technical solution.

A smart card simultaneously having two read-write modes, comprising an antenna layer and an antenna and a chip module circuit layer arranged on the antenna layer, wherein the antenna and the chip module circuit layer are electrically connected through an elastic conductive device.

The coil wire end of the antenna is electrically connected with the elastic conductive device, the elastic conductive device is arranged in a region corresponding to a circuit contact point of the chip module circuit layer, and one surface of the elastic conductive device is in electric contact connection with the circuit contact point of the chip module circuit layer.

The elastic conductive device is a metal elastic conductive device.

The elastic conductive device is a non-metal elastic conductive device.

The coil wire end of the antenna is arranged in a region corresponding to the circuit contact point of the chip module circuit layer on the antenna layer in a single-loop or multi-loop meandering winding manner.

The coil wire end of the antenna is electrically connected with the other surface of the elastic conductive device in a welding manner.

The coil wire end of the antenna is electrically connected with the other surface of the elastic conductive device in a direct contact manner.

The thickness of the antenna layer is 0.13-0.16 mm.

The present invention also provides a production method of the above-mentioned smart card simultaneously having two read-write modes, comprising the following steps:

1) embedding antenna: embedding an antenna on the back surface or front surface of an antenna layer, and placing the coil wire end of the antenna in a region corresponding to a circuit contact point of a chip module circuit layer;

2) laminating: after embedding the antenna on the antenna layer, respectively adding a pad layer, a printing layer and a protection layer on the upper and lower parts of the antenna layer, and laminating to obtain a card base carrier;

3) cutting card and milling grooves: cutting a card from the laminated integral card base carrier to finally obtain a card base, milling grooves on the obtained card base, at first milling grooves on a chip module placement position, firstly milling a first recess, wherein the thickness of the first recess is equal to that of the chip module boundary, then, milling a second recess in the middle of the first recess, wherein a milling cutter provided with a special sensor is used for milling the position, and the milling cutter detects whether an antenna embedding layer is milled in the groove milling process in real time, immediately stops according to a preset program once milling the coil wire end of the embedded antenna and memorizes the value, and finally, milling a third recess on position where an elastic device is placed, wherein the depth of the third recess is determined by the memorized value; and 4) encapsulating: firstly placing the elastic device in the third recess and electrically connecting the elastic device with the coil wire end of the antenna, putting the chip module circuit layer in the first recess and the second recess on positions where the circuit contact points are corresponding to the elastic device, and finally, setting.

In the step 1), the coil wire end of the antenna is made into a contact pad in a meandering winding manner, and the contact pad is located in the region corresponding to the circuit contact point of the chip module circuit layer.

According to the smart card simultaneously having two read-write modes and the production method thereof of the present invention, the antenna and the chip module circuit layer are electrically connected by the elastic conductive device while needing no such manual operations as tin soldering and the like, thereby improving the production efficiency, and since the milling cutter provided with the special sensor is used for milling grooves, the product quality is ensured, the yield is high and the stability of the produced smart card is good.

According to international and domestic standards, a bending distortion test is 2-3 times higher than the standards, a high-temperature and high-humidity impact resistance experiment is 0.5-1 time higher than the standards. All other indexes satisfy the international and domestic standards.

A further illustration is given below on the smart card simultaneously having two read-write modes and the production method thereof of the present invention, in conjunction with accompanying drawings.

DETAILED DESCRIPTION OF THE PREFERRED EMBODIMENT

Figure 1:
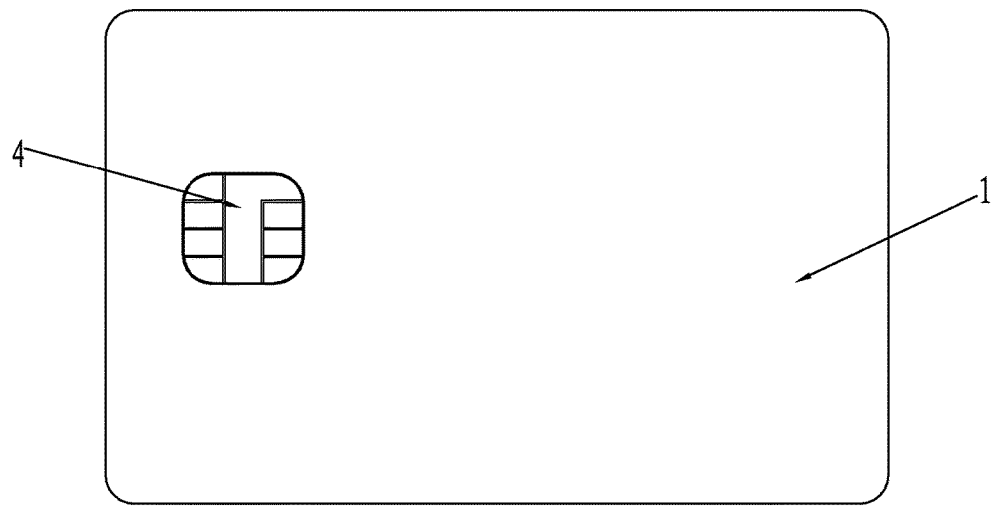
FIG. 1 is a structural schematic diagram of a smart card simultaneously having two read-write modes of the present invention.
Figure 2:
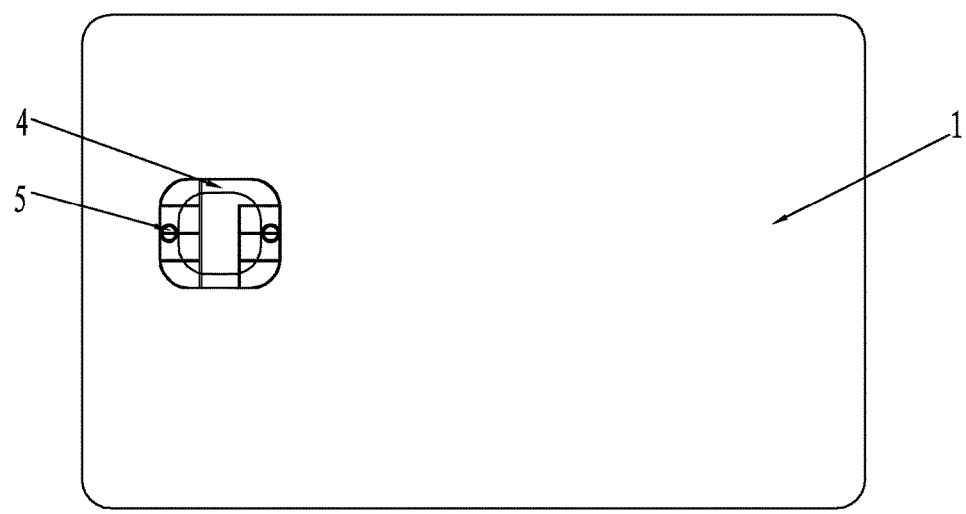
FIG. 2 is a perspective drawing of a smart card simultaneously having two read-write modes of the present invention.
Figure 3:
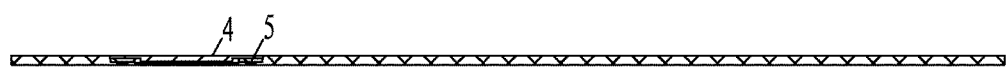
FIG. 3 is a section view of a smart card simultaneously having two read-write modes of the present invention.
Figure 4:
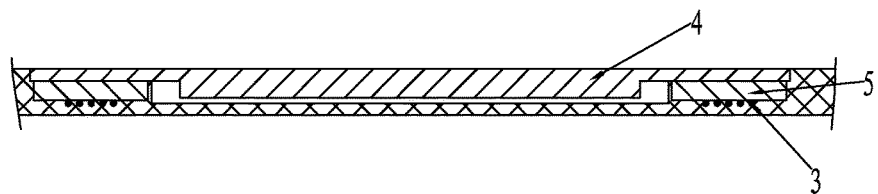
FIG. 4 is a partial enlarged view of FIG. 3.

As shown in FIGS. 1-4 and FIG. 7, the smart card simultaneously having two read-write modes of the present invention comprises a base layer 1, an antenna layer 2, and an antenna 3 and a chip module circuit layer 4 arranged on the antenna layer 2, the thickness of the antenna layer 2 is 0.13-0.16 mm, the antenna layer 2 is arranged in the base layer 1, the coil wire end of the antenna 3 is arranged in a region corresponding to a circuit contact point of the chip module circuit layer 4 on the antenna layer 2 in a single-loop or multi-loop meandering winding manner, recesses B5, B6 are formed in the base layer 1, two recesses B3 are respectively formed in the bottom surface of the recess B5, two elastic conductive devices 5 are provided and are respectively arranged in the two recesses B3, the elastic conductive devices 5 are respectively arranged in regions corresponding to two circuit contact points of the chip module circuit layer 4, the coil wire end 31 of the antenna 3 is electrically connected with one of the surfaces of the elastic conductive devices 5, the chip module circuit layer 4 is arranged in the recesses B5, B6, and the other surfaces of the elastic conductive devices 5 are in electric contact connection with the circuit contact points of the chip module circuit layer 4. The elastic conductive devices 5 are metal elastic conductive devices, for example, metal spring tablets, may also be non-metal elastic conductive devices, for example, conductive graphite. The coil wire end 31 of the antenna 3 is electrically connected with the elastic conductive devices in a welding manner or a direct contact manner.

Figure 7:
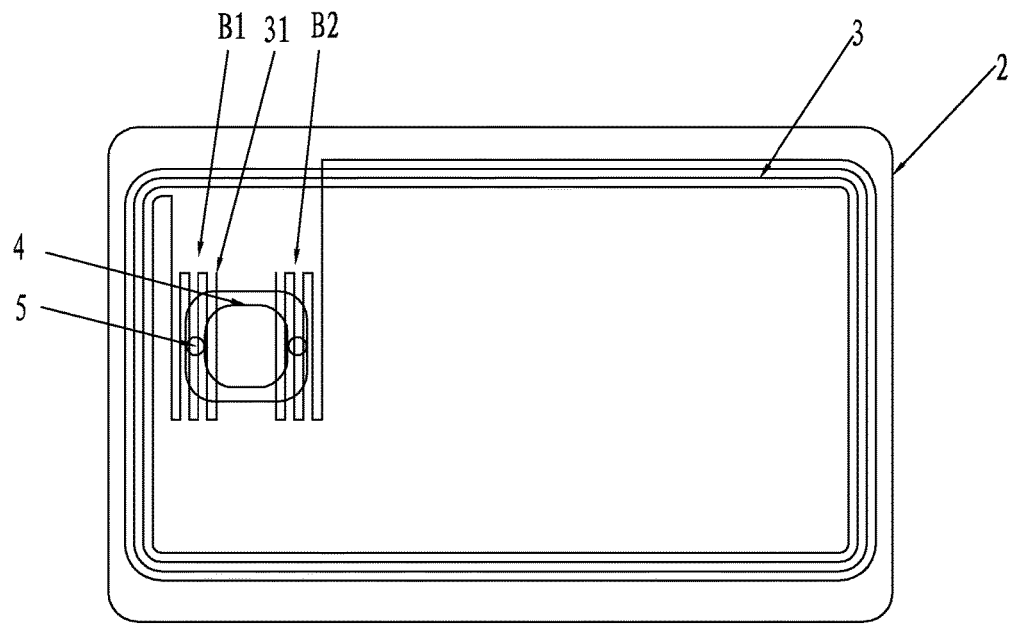
FIG. 7 is a structural schematic diagram of linear position relation of a chip module, an elastic conductive device and an antenna.
Figure 8:
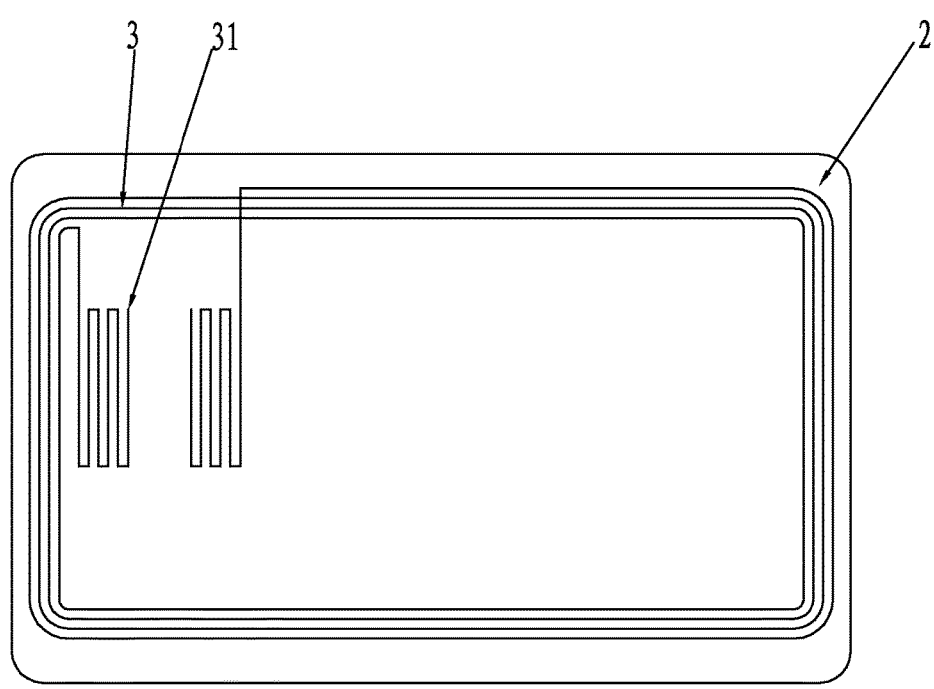
FIG. 8 is a linear structural schematic diagram after an antenna is embedded in an antenna layer.

A production method of the smart card simultaneously having two read-write modes of the present invention comprises the following steps:

1) Embedding Antenna:

as shown in FIG. 8, embedding the antenna 3 on the back surface or front surface of the antenna layer 2, and making the coil wire end of the antenna 3 into a contact pad in a meandering winding manner, or making a contact clip by using other methods, for example, welding an electric wire on a sheet metal, placing the contact pad or the contact clip on positions corresponding to two circuit contact points of the chip circuit layer 4, namely, a chip module, on the antenna layer 2, for example, on positions B1 and B2 (FIG. 7), so as to ensure good contact between the antenna and the chip module through the elastic conductive devices, and FIG. shows a meandering winding manner of the coil wire end.

2) Laminating:

after embedding the antenna on the antenna layer 2, respectively adding a pad layer, a printing layer and a protection layer on the upper and lower parts of the antenna layer 2 to form the base layer, laminating to obtain a stably adhered card base carrier, the thicknesses of the layers may be changed according to different requirements, in the embodiment, the thickness of the antenna layer 2 is about 0.15 mm, the pad layer, the printing layer and the protection layer are respectively added to the upper and lower parts of the antenna layer to ensure certain strength, and the thickness of a final card base may reach about 0.8 mm.

Figure 5:
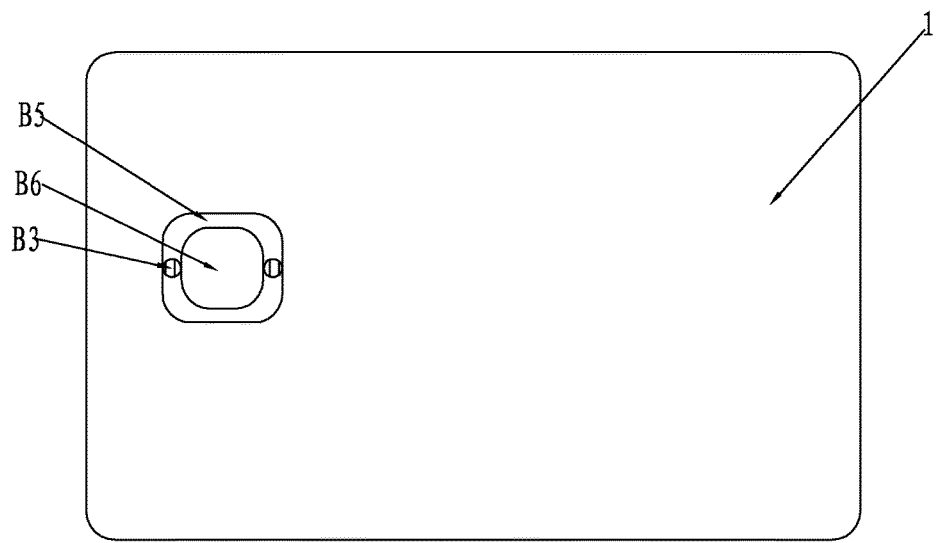
FIG. 5 is a structural schematic diagram of a card base with processed recesses.

3) Cutting Card and Milling Grooves:

cutting a card from the laminated integral card base carrier to finally obtain the card base, milling grooves on the obtained card base, as shown in FIG. 5, at first milling grooves on a position where the chip module circuit layer 4 is placed, firstly milling a first recess B5, wherein the thickness of the first recess B5 is equal to that of the boundary of the chip module circuit layer 4, then, milling a second recess B6 in the middle of the first recess B5, wherein a milling cutter provided with a special sensor is used for milling the position, and the milling cutter detects whether an antenna embedding layer is milled in the groove milling process in real time, immediately stops according to a preset program once milling the coil wire end of the embedded antenna and memorizes the value, the groove milling precision is guaranteed by using the method, and finally, milling a third recess B3 on a position where the elastic conductive devices 5 are placed, wherein the depth of the third recess B3 is determined by the memorized value.

Figure 6:
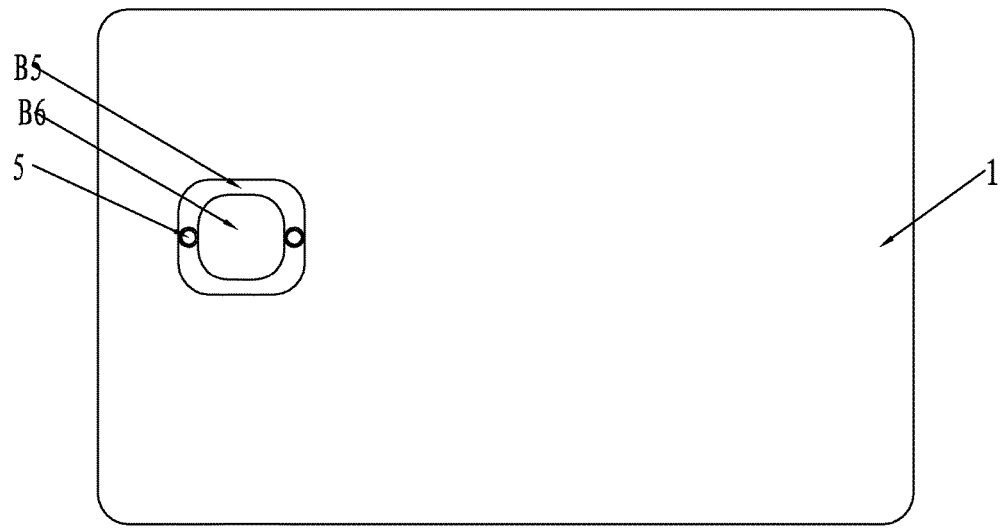
FIG. 6 is a structural schematic diagram after an elastic conductive device is placed.

4) Encapsulating:

As shown in FIGS. 6 and 7, firstly placing the elastic conductive devices 5 in the third recess B3, then, placing the chip module circuit layer 4 in the first recess B5 and the second recess B6 on positions where the circuit contact points are corresponding to the elastic conductive devices 5, finally, performing thermal encapsulation and cold encapsulation setting and testing functions of the smart card.

The above-mentioned embodiments are merely descriptions of preferable embodiments of the present invention, rather than limiting the protection scope of the present invention. Various variations and improvements made to the technical solution of in the present invention by those of ordinary skill in the art without departing from the essence of the present invention shall fall within the protection scope of the present invention.

PRACTICAL APPLICABILITY

The smart card simultaneously having two read-write modes of the present invention may be widely used in finance/accounting, social insurance, transportation and tourism, medical treatment and public health, government administration, commodity retailing, entertainment, school management and other fields.

What is claimed is:

1. A smart card simultaneously having two read-write modes, comprising an antenna layer (2) and an antenna (3) and a chip module circuit layer (4) arranged on the antenna layer (2), wherein the antenna (3) and the chip module circuit layer (4) are electrically connected through a metallic or non-metallic elastic conductive device (5), a coil wire end (31) of the antenna (3) is electrically connected with the elastic conductive device (5), the elastic conductive device (5) is arranged in a region corresponding to a circuit contact point of the chip module circuit layer (4), one surface of the elastic conductive device (5) is in electric contact connection with the circuit contact point of the chip module circuit layer (4), and the coil wire end (31) of the antenna (3) is made into a contact pad in a single-loop or multi-loop meandering winding manner and is arranged in a region corresponding to the circuit contact point of the chip module circuit layer (4) on the antenna layer (2).

2. The smart card, as recited in claim 1, wherein the coil wire end (31) of the antenna (3) is electrically connected with the other surface of the elastic conductive device (5) in a welding manner.

3. The smart card, as recited in claim 1, wherein the coil wire end (31) of the antenna (3) is electrically connected with the other surface of the elastic conductive device (5) in a direct contact manner.

4. The smart card, as recited in claim 2, wherein the thickness of the antenna layer (2) is 0.13-0.16 mm.

5. The smart card, as recited in claim 3, wherein the thickness of the antenna layer (2) is 0.13-0.16 mm.

6. A production method of a smart card simultaneously having two read-write modes, comprising steps of:
  1) embedding antenna (3): embedding an antenna (3) on a back surface or a surface of an antenna layer (2), and placing a coil wire end (31) of the antenna (3) in a region corresponding to circuit contact points of a chip module circuit layer (4), wherein the coil wire end (31) of the antenna (3) is made into a contact pad in a meandering winding manner, and the contact pad is located in a region corresponding to the circuit contact point of the chip module circuit layer (4);
  2) laminating: after embedding the antenna (3) on the antenna layer (2), respectively adding a pad layer, a printing layer and a protection layer on an upper and a lower parts of the antenna layer (2), and laminating to obtain a card base carrier;
  3) cutting card and milling grooves: cutting a card from the laminated integral card base carrier to finally obtain a card base, milling grooves on the obtained card base, at first milling grooves on a position where a chip module is placed, firstly milling a first recess (B5), wherein a thickness of the first recess (B5) is equal to that of the chip module boundary, then, milling a second recess (B6) in a middle of the first recess (B5), wherein a milling cutter provided with a special sensor is used for milling the position, and the milling cutter detects whether an antenna (3) embedding layer is milled in the groove milling process in real time, immediately stops at a maximum milled depth value according to a preset program once milling the coil wire end (31) of the embedded antenna (3) and memorizes the maximum milled depth value, and finally, milling a third recess (B3) on a position where an elastic device is placed, wherein a depth of the third recess (B3) is determined by the memorized value; and
  4) encapsulating: firstly placing the elastic device in the third recess (B3) and electrically connecting the elastic device with the coil wire end (31) of the antenna (3), putting the chip module circuit layer (4) in the first recess (B5) and the second recess (B6) on positions where the circuit contact points are corresponding to the elastic device, and finally, securing the chip module layer into the first and/or the second recesses.

* * * * *